3,475,244
BONDING OF COMPRESSED GRAPHITE STRUCTURES
James A. Sanders, Jr., Houston, Tex., assignor to The Dow Chemical Company, Midland, Mich., a corporation of Delaware
No Drawing. Filed Apr. 4, 1966, Ser. No. 539,632
Int. Cl. B32b *31/20, 7/12*
U.S. Cl. 156—83                    10 Claims

ABSTRACT OF THE DISCLOSURE

This invention relates to a process for pressure-bonding compressed vermicular graphite structures to other relatively dense structures or to other compressed vermicular graphite structures. The compressed vermicular graphite surface to be bonded is first treated with a re-expanding agent which penetrates the surface, then is heated to a temperature sufficient to produce re-expansion of the graphite surface, and finally is pressed tightly against the structure to which the graphite is to be pressure-bonded.

---

This invention relates to a process for bonding compressed graphite structures and is more particularly related to a process for bonding relatively dense structures of compressed vermicular graphite to other relatively dense structures.

As disclosed in French Patent No. 1,395,964, most forms of natural and synthetic graphite may, upon proper treatment, be expanded by heat to form a light weight, particulate, vermicular form of graphite which may be compressed into more dense integral structures.

Compression of such expanded vermicular graphite along a single vector will produce a compacted integral structure having high electrical and thermal anisotropy. Both electrical and thermal resistivity are highest in the plane of compression and lowest in the plane perpendicular to that of compression. The anisotropy ratio between such planes increases with increasing compression up to or near the theoretical density of the graphite. Biaxial compression substantially reduces the anisotropy and if the vermicular graphite is compressed isostatically or triaxially little or no anisotropy can be produced. It can be seen, therefore, that structures having substantially any desired electrical and thermal orientation can be produced by compression of vermicular graphite in the proper manner.

To produce structures having acceptable conductive characteristics, it is usually desirable to apply a compression force of at least 30 p.s.i. To produce structures having an acceptable physical strength for most structural applications as well as good conductivity characteristics it is desirable to apply a compression force of 2000 p.s.i. or more to achieve densities between 1.4 and 2.26 gm./cc. Due to the extreme mechanical difficulties involved in reducing a mass of very light weight vermicular graphite (usually having a density of about 0.005–0.010 gm./cc.) to a relatively high density, relatively small structures are often made. It would be highly desirable in many instances to bond such structures together to produce larger structures or to produce structures having different electrical and thermal characteristics in different areas, or to bond thin graphite foils to other relatively high density materials such as sandblasted steel, rough surfaced ceramics, etc. Compacted graphite configurations, particularly that having a density above about 1.4 gm./cc., however, do not form a strong bond when compressed, even at high pressures, directly against another surface.

Now, unexpectedly, it has been found that by the process of this invention two or more graphite structures can be bonded together to form a unitary, monolithic structure. The present novel process likewise permits compressed graphite foil structures to be bonded to other relatively dense structures having roughened surfaces such as metals (e.g. iron, steel, copper, nickel, aluminum and the like), glass, wood, ceramics, plastics, cements and the like.

It is an object of this invention, therefore, to provide a process whereby relatively dense structures of compressed vermicular graphite may be bonded to other material by the application of pressure. A further object is to provide a process whereby two or more relatively dense structures of compressed vermicular graphite may be bonded to one another to form a monolithic structure. These and other objects and advantages of the present invention will become obvious from the following detailed description.

It has now been discovered in accordance with the present invention that a relatively dense structure of compressed vermicular graphite may be bonded to another relatively dense structure by treating the surface of the compressed graphite which is to be bonded with a re-expanding agent such as $H_2SO_4$, $HNO_3$, $H_2O$, acetone or the like, heating the treated surface sufficiently to produce an expansion of the surface to vermicular form and compressing the thus expanded surface of the graphite structure in contact with another surface to be bonded thereto.

In order to achieve the bonding of relatively high density compacts of compressed vermicular graphite to other such compacts or to other relatively dense structures by the present novel process, the surface of the compressed graphite to be bonded is first treated with a re-expanding agent and heated to cause at least a portion of such surface to expand. By re-expanding agent is meant those agents which will enter the space between the laminate within the graphite to such an extent that upon heating, the surface of such graphite will expand. Suitable agents include intercalating agents, fuming nitric and sulfuric acids, mixtures of concentrated nitric and sulfuric acids, perhaloacids, bromine, and the like as well as liquids such as $H_2O$, acetone, and the like which are not true intercalating agents but which will be absorbed sufficiently by the graphite surface to produce expansion thereof upon heating. In some instances, it is also advantageous to roughen the surface of the compressed graphite mechanically or to heat the surface of the compressed graphite to a temperature of up to the boiling point of the expanding agent at the time of adding the expanding agent. Such heat treatment gives greater depth of penetration.

A temperature of 500° C. or more is usually required to produce adequate expansion and it is usually convenient to produce such temperature with a flame from methane, propane or acetylene and air or oxygen, electrical heat, etc.

Once the surface of the compressed graphite structure has been thus expanded, the structure may be tightly bonded to other relatively high density structures by compressing such expanded surface while in intimate contact with the surface of the structure or structures under a pressure of at least 30 p.s.i., preferably above a pressure of at least about 500 p.s.i. and most preferably above about 1500 p.s.i. Such pressure may be applied as a uniaxial force at right angles to the surfaces being joined or such pressure may be isostatic. If two relatively high density compressed graphite structures are to be joined, considerable advantage is gained by expanding both of the faces to be contacted prior to joining by compression.

The compressed graphite structures employed herein are prepared from vermicular graphite which may be prepared, for example, by introducing an intercalating agent such as fuming nitric acid, fuming $H_2SO_4$ or a mixture of concentrated nitric and sulfuric acids, $HClO_3$, etc. between the laminae of natural flake graphite and expanding such graphite by the application of heat thereto. Usually, a temperature of 500° C. or more is required to produce good expansion but under some circumstances, a lower temperature may be employed. Under these conditions an expansion in volume of from 20 to 400 times usually occurs to produce a very light weight, particulate vermicular form which is easily malleable and compressible into shaped integral structures.

While the process of this invention is useful to join substantially any compressed vermicular graphite structure to a relative dense structure, it finds particular application in the joining of compressed vermicular graphite structures having a density above about 1.4 gm./cc. to other relatively dense structures and is especially useful in the joining of compressed vermicular graphite compacts to other compressed vermicular graphite compacts.

The following examples are for the purpose of more fully illustrating the invention but are not to be construed as limiting it thereto.

EXAMPLE 1

A series of ten uniaxially compressed blocks having densities ranging from 1.4 to 1.86 were prepared from vermicular graphite having a density of 0.005 gm./cc. Each block was about 2¼ inches square and had a thickness of 0.4 inch. Such blocks were bonded together in groups by first heating the surfaces to be joined to a temperature of 60° C. and spraying the heated surface with fuming $HNO_3$. A propane flame was then contacted with the treated surface to produce the expansion thereof. The surfaces of the blocks to be joined were placed in contact with one another and a pressure of 17,000 p.s.i. was applied at right angles to such surfaces with results as follows:

| Block No.: | Bonded to Block No. | Density Before Bonding, gm./cc. | Physical Bonding | Voltage drop at same current across joint with next block over 0.379 in gap |
|---|---|---|---|---|
| 1 | 2 | 1.41 | Excellent | 3.31 mv. |
| 2 | 3 | 1.62 | do | 2.02 mv. |
| 3 | 4 | 1.47 | do | 2.25 mv. |
| 4 | | 1.47 | do | |
| 5 | 6 | 1.44 | do | 2.50 mv. |
| 6 | 7 | 1.61 | do | 2.77 mv. |
| 7 | 8 | 1.80 | do | 2.40 mv. |
| 8 | | 1.79 | do | |
| 9 | 10 | 1.84 | do | 1.97 mv. |
| 10 | | 1.83 | do | |

The density of the compressed structure after bonding was 1.91 gm./cc. To show the quality of the resulting joined structures the measured average voltage drop for a 0.379 in. section of such blocks in an area where there was no joint was 2.07 mv.

EXAMPLE 2

Six blocks were prepared by uniaxially compressing vermicular graphite having a density of 0.005 gm./cc. Two pairs of such blocks were bonded together by heating the surfaces to be joined to a temperature of 60° C., spraying such surface with fuming $HNO_3$, and heating with a propane flame until no acid odor was detectable. The surfaces to be joined expanded by such heating and were pressed together under a pressure of 17,000 p.s.i. applied perpendicular to the bonding plane to form a unitary, monolithic structure.

As a control, the remaining two blocks were likewise compressed together under 17,000 p.s.i. of pressure but no surface treatment and expansion was employed.

All of the so-joined samples thus prepared were broken apart by applying a tensile load perpendicular to the bonding plane. The result are shown in the following tabulation:

| | Density gm./cc., Before Bonding | | After Bonding | Tensile Stress at Bonding Failure, p.s.i. |
|---|---|---|---|---|
| | Block A | Block B | | |
| Control | 1.47 | 1.47 | 1.86 | 0 |
| Surface re-expanded | 1.41 | 1.62 | 1.9 | 6.64 |
| Do | 1.47 | 1.44 | 1.9 | 6.86 |

In the same manner, sheets of compressed vermicular graphite foil having a density of 1.64–1.69 gm./cc. were bonded together under a pressure of 17,000 p.s.i Those foils wherein the surface to be joined was first treated and expanded produced a good bond but in the untreated foils no bonding was achieved.

EXAMPLE 3

A flat piece of sandblasted steel was clamped to a 0.5 inch square bar of compressed graphite under various clamping pressures and the voltage drop across the interface between the steel and the graphite was recorded. Another 0.5 inch square bar of compressed graphite was first heated, treated with fuming $NHO_3$, expanded with a propane flame as described in Example 1 and then clamped to a flat piece of sandblasted steel under various clamping pressures. Current was passed between the steel and the graphite and the following results were obtained:

| Compressed Graphite Bar | Millivolt drop/amp ratio at following clamp pressures | | | | |
|---|---|---|---|---|---|
| | 40 p.s.i. | 80 p.s.i. | 120 p.s.i. | 160 p.s.i. | 200 p.s.i. |
| Unexpanded (control) | 50.0 | 21.0 | 24.2 | 21.9 | 21.8 |
| Expanded | 36.1 | 20.0 | 14.2 | 13.0 | 11.8 |

I claim:
1. A process for the bonding of compressed vermicular graphite structures to other relatively dense structures which comprises
   (a) treating the surface of a compressed vermicular graphite structure having a minimum density of about 1.4 gm./cc. with a re-expanding agent,
   (b) heating the treated surface to produce expansion thereof,
   (c) directly contacting the resulting expanded graphite surface of said compressed vermicular graphite structure with a second relatively dense structure having a roughened surface, and
   (d) compressing the thus contacted structures under a compression force of at least 30 p.s.i. to form an adhesive-free bond between said surfaces.

2. The process of claim 1 wherein the treated graphite surface is heated to at least 500° C.

3. The process of claim 1 wherein the compression force is at least 2000 p.s.i.

4. The process of claim 1 wherein the compressed vermicular graphite structure has a density of between about 1.4 gm./cc. and about 2.26 gm./cc.

5. A process for bonding relatively dense compressed vermicular graphite structures to one another which comprises
   (a) treating the surface of at least one of each pair of compressed vermicular graphite structures to be joined with a re-expanding agent,
   (b) heating each treated surface sufficiently to re-expand such vermicular graphite,
   (c) directly contacting the re-expanded graphite surface of said compressed vermicular graphite structure with the graphite structure to be bonded thereto, and (d) compressing the contacted structures under a compressive force sufficient to produce a monolithic structure.

6. The process of claim 5 wherein all surfaces to be joined are treated with an expanding agent, heated to produce expansion and compressed together to form a monolithic structure.

7. The process of claim 5 wherein the treated graphite surfaces are heated to at least 500° C.

8. The process of claim 5 wherein the compression force is at least 500 p.s.i.

9. The process of claim 5 wherein the compression force is at least 1500 p.s.i.

10. The process of claim 5 wherein the compressed graphite structures to be bonded have a density of between about 1.4 gm./cc. and 2.06 gm./cc.

References Cited

UNITED STATES PATENTS

| | | | |
|---|---|---|---|
| 3,323,869 | 6/1967 | Olstowski | 23—209.1 |
| 3,404,061 | 10/1968 | Shane et al. | 264—109 |

ROBERT F. BURNETT, Primary Examiner

J. D. FOSTER, Assistant Examiner

U.S. Cl. X.R.

23—209.2, 314; 156—306; 264—113, 115